United States Patent
Costa et al.

(10) Patent No.: US 10,530,502 B2
(45) Date of Patent: Jan. 7, 2020

(54) COMMUNICATION DEVICES, CONTROL DEVICE AND METHODS THEREOF

(71) Applicant: HUAWEI TECHNOLOGIES CO., LTD., Shenzhen, Guangdong (CN)

(72) Inventors: Mario Costa, Helsinki (FI); Petteri Kela, Helsinki (FI); Kari Heiska, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 15/684,025

(22) Filed: Aug. 23, 2017

(65) Prior Publication Data

US 2017/0353250 A1    Dec. 7, 2017

Related U.S. Application Data

(63) Continuation of application No. PCT/EP2015/053832, filed on Feb. 24, 2015.

(51) Int. Cl.
| | | |
|---|---|---|
| *H04B 17/318* | (2015.01) | |
| *H04W 16/14* | (2009.01) | |
| *H04W 24/10* | (2009.01) | |

(52) U.S. Cl.
CPC .......... *H04B 17/318* (2015.01); *H04W 16/14* (2013.01); *H04W 24/10* (2013.01)

(58) Field of Classification Search
CPC ..... H04B 17/318; H04W 16/14; H04W 24/10
USPC ................................................ 370/241, 252
See application file for complete search history.

(56) References Cited

U.S. PATENT DOCUMENTS

| | | | |
|---|---|---|---|
| 2010/0233965 A1 | 9/2010 | Fukuoka | |
| 2012/0082116 A1* | 4/2012 | Kwon | H04B 7/0689 370/329 |
| 2014/0254401 A1* | 9/2014 | Talwar | H04W 24/10 370/252 |
| 2015/0126188 A1 | 5/2015 | Lindoff et al. | |
| 2018/0049240 A1* | 2/2018 | Kim | H04W 74/08 |

FOREIGN PATENT DOCUMENTS

CN    104285457 A    1/2015

OTHER PUBLICATIONS

International Search Report dated Jan. 12, 2015 in corresponding International Patent Application No. PCT/EP2015/053832.

(Continued)

*Primary Examiner* — Obaidul Huq
(74) *Attorney, Agent, or Firm* — Leydig, Voit & Mayer, Ltd.

(57) ABSTRACT

The embodiments of the present invention relates to a first communication device, a second communication device, and a control device. According to the embodiments of the present invention beacon signals are broadcasted by first communication devices in a wireless communication system. The broadcasted beacon signals are used for calculation of received power or pathloss by second communication devices. The calculated received power or pathloss is used for estimating interference in the wireless communication system by control devices. Furthermore, the embodiments of the present invention also relates to corresponding methods, a computer program, and a computer program product.

11 Claims, 10 Drawing Sheets

(56) References Cited

OTHER PUBLICATIONS

*IEEE 802.22™/P802.22/D3.0, Mar. 2011 Draft Standard for Wireless Regional Area Networks Part 22: Cognitive Wireless RAN Medium Access Control (MAC) and Physical Layer (PHY) specifications: Policies and procedures for operation in the TV Bands*, XP68010185, pp. 1-655.
Tim Irnich et al., *Spectrum Sharing Scenarios and Resulting Technical Requirements for 5G Systems*, 2013 IEEE 24th International Symposium on Personal, Indoor and Mobile Radio Communications: Workshop on Spectrum sharing strategies for wireless broadband services, pp. 127-132.
Petteri Kela et al., *A Novel Radio Frame Structure for 5G Dense Outdoor Radio Access Networks*, 2015 IEEE (6 pp.).
J.-P. Kermoal et al., *Spectrum Sharing for WINNER Radio Access Networks*, 2006 IEEE (5 pp.).
International Search Report, dated Dec. 1, 2015, in International Application No. PCT/EP2015/053832 (5 pp.).
Written Opinion of the International Searching Authority, dated Dec. 1, 2015, in International Application No. PCT/EP2015/053832 (7 pp.).
"Draft Standard for Wireless Regional Area Networks Part 22: Cognitive Wireless RANMedium Access Control (MAC) and Physical Layer (PHY) specifications: Policies and procedures for operation in the TV Bands," IEEE 802.22™/P802.22/D2.0, pp. 1-698, Institute of Electrical and Electronics Engineers, New York, New York (Feb. 2011).

\* cited by examiner

COMMUNICATION DEVICES, CONTROL DEVICE AND METHODS THEREOF

CROSS-REFERENCE TO RELATED APPLICATIONS

This application is a continuation of International Application No. PCT/EP2015/053832, filed on Feb. 24, 2015, the disclosure of which is hereby incorporated by reference in its entirety.

TECHNICAL FIELD

The embodiments of the present invention relates to a first communication device, a second communication device, a control device, and a wireless communication system thereof. Furthermore, the embodiments of the present invention also relates to corresponding methods, a computer program, and a computer program product.

BACKGROUND

When two or more radio access networks share the same spectrum in a wireless communication system without any exclusive, dedicated and fixed sharing of spectrum, methods for spectrum allocation are needed. The spectrum allocation period can vary in length, e.g. spanning from milliseconds (i.e. dynamic allocation) to days or even months (i.e. semi-permanent allocation). The spectrum allocation method can be based on instantaneous spectrum needs, load of the radio access networks, interference tolerance of the radio access networks, bidding results from spectrum auctions, etc.

Further, spectrum allocation has to take into account the density and locations of various network nodes, such as access nodes, as well as the out-of-band characteristics of the network nodes.

Future 5G radio access networks are expected to enable new services and business opportunities leading to a large number of co-located Public Land Mobile Networks (PLMNs). Therefore, solutions for spectrum sharing and dynamic spectrum allocation are needed in future wireless communication systems. Such a need is even more stringent in densely populated areas where the need for additional spectrum is considered to be most urgent. Hence, crucial technical questions for spectrum sharing and dynamic spectrum allocation are e.g.:

How to avoid interference between co-located radio access networks?

How to share the available spectral resources in a fair and dynamic manner?

The availability of the spectrum can be inferred by using measurements and following network sharing rules agreed among all the parties involved, such as network operators, users of the adjacent bands, and spectrum authorities. The current spectrum usage can be measured not only in the temporal dimension but also in the power-density or spatial dimensions, such as locations, polarizations, and direction. The usage of the spectrum in the spatial dimension can be estimated with measurements or by using appropriate numerical analysis tools.

There are various conventional technologies related to spectrum sharing. In a Common Radio Resource Manager (CRRM), the participating radio access networks have a common entity which is governing the spectrum usage in a controlled manner. In this approach the radio access networks share information regarding their usage of the radio resources such as transmission time, power, codes, etc. A drawback of the CRRM approach is that the radio networks participating in the spectrum sharing lose their independency and may send valuable (even confidential) information of their own radio networks. With CRRM, two radio access networks are merged into a single radio access network in many aspects. This may lead to difficulties in managing the common part of the radio access network planning and operation.

Another approach is to utilize Geo-Location Databases (GLDBs) to inform of the sharing radio access networks about the free spectrum in a particular location. The GLDB should incorporate information on sharing rules determined by the local spectrum administrator. The GLDB lacks information on actual spectrum usage and local propagation conditions. The rules for the co-existence are typically very general causing inaccuracies and inefficient spectrum usage.

Cognitive Radio (CR) with in-build spectrum sensing functionalities in radio devices are suggested for detecting local white-spaces, i.e. unused spectrum. Spectrum sensing is typically implemented with power detectors, or correlators depending on the radio technology used. Spectrum sensing at the user device side may not be attractive due to the power consumption required for such a task.

SUMMARY

An objective of embodiments of the present invention is to provide a solution which mitigates or solves the drawbacks and problems of conventional solutions.

Another objective is to provide a solution for improved interference calculation in wireless communication systems.

Yet another objective is to provide a solution for improved time and frequency resource allocation and/or spectrum sharing in wireless communication systems.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the embodiments of the present invention can be found in the dependent claims.

According to a first aspect of the invention, the above mentioned and other objectives are achieved with a first communication device for a wireless communication system, the first communication device comprising a transceiver;

wherein the transceiver is configured to broadcast at least one beacon signal $S_b$ during a measurement time period, wherein the measurement time period is exclusively allocated for broadcasting of beacon signals, and wherein the at least one beacon signal $S_b$ is broadcasted in unique orthogonal time and frequency resources allocated for the first communication device.

The beacon signal $S_b$ may according to a possible implementation form include a reference signal which is known both to the transmitter (first communication device) and the receiver (second communication device) of the wireless communication system.

The measurement time period is, as mentioned above, allocated for broadcasting of beacon signals in the wireless communication system. Therefore no other types of overlapping or interfering transmissions are allowed during the measurement time periods. Further, each first communication device is allocated its own unique time and frequency resources in the measurement time period. Hence, with the unique time and frequency resources the beacon signals of the first communication device can easily be identified. The unique time and frequency resources are orthogonal resources meaning that a plurality of first communication devices can perform non-interfering beacon transmissions.

With a first communication device configured to broadcast at least one beacon signal $S_b$ during a measurement time period in unique time and frequency resources according to embodiments of the present invention a number of advantages are provided.

The first communication device enables improved interference estimation in wireless communication system since with the beacon signal $S_b$ the receiver(s) can more accurately and precisely calculate received power and/or pathloss. Therefore, also the interference in the wireless communication system can be estimated more accurately in the wireless communication system by using the calculated received power and/or pathloss.

Moreover, since the beacon signals are transmitted in unique time and frequency resources the pathloss of each individual transmitter (i.e. first communication device) can easily be calculated. Therefore, the interference coupling between different transmitters can efficiently and precisely be estimated.

With improved interference estimations interference can be avoided or mitigated in the wireless communication system. Further, with improved interference estimations also improved allocation of time and frequency resources and/or spectrum sharing is possible in the wireless communication system.

In a first possible implementation form of a first communication device according to the first aspect, the transceiver further is configured to receive a first signal $S_1$ from a second communication device, the first signal $S_1$ indicating the unique orthogonal time and frequency resources allocated for the first communication node.

With this first implementation form the unique time and frequency resources are signalled to the first communication device. Thereby, dynamic or semi-dynamic allocation is possible of the time and frequency resources during the measurement time periods. Also, adaption to different radio propagation conditions is possible with this implementation form.

In a second possible implementation form of a first communication device according to the first possible implementation form of the first aspect or to the first communication device as such, the first signal $S_1$ further indicates a start point and an end point for the measurement time period.

The measurement time period defines the time period in which the first communication devices are allowed to transmit beacon signals and the second communication devices are measuring the beacon signals by scanning. The measurement time period should be known to all communication devices in the wireless communication system and therefore the signaling with start point and end point information for the measurement time period may be used for time synchronization of the measurement time periods.

In a third possible implementation form of a first communication device according to the first or second possible implementation form of the first aspect or to the first communication device as such, the first communication device is an access node device or a user device of the wireless communication system.

According to a second aspect of the invention, the above mentioned and other objectives are achieved with a second communication device for a wireless communication system, the second communication device comprising:

a processor, and
a transceiver;

wherein the transceiver is configured to scan time and frequency resources of the wireless communication system during a measurement time period, wherein the measurement time period is exclusively allocated for broadcasting of beacon signals, and wherein each beacon signal is broadcasted by a first communication device in unique orthogonal time and frequency resources allocated for the first communication device;

wherein the processor is configured to calculate received power or pathloss for the beacon signals; and wherein the transceiver further is configured to forward a second signal $S_2$ to a control device of the wireless communication system, wherein the second signal $S_2$ indicates the calculated received power or calculated pathloss.

With a second communication device configured to scan time and frequency resources and calculate received power and/or pathloss for the beacon signals according to embodiments of the present invention a number of advantages are provided.

The second communication device provides (improved) calculation of received power and/or pathloss. Therefore, the interference and especially the mutual interference in the wireless communication system can be estimated in the wireless communication system.

Moreover, since the beacon signals are transmitted in unique time and frequency resources the pathloss for each individual transmitter-receiver pair (i.e. between a first communication device and a second communication device) can be calculated. Therefore, the interference coupling between different transmitters can also efficiently be estimated. In the case of a plurality of independent radio access networks the mutual interference can be the interference between the plurality of radio access networks. Moreover, the present solution also makes possible interference estimation between transmitter-receiver pairs belonging to the same or different radio access networks.

With the present interference estimations interference can be avoided or mitigated in the wireless communication system. Further, with improved interference estimations also improved allocation of time and frequency resources and/or spectrum sharing is possible.

In a first possible implementation form of a second communication device according to the second aspect, when the second communication device is an access node device, the transceiver further is configured to receive a third signal $S_3$ from the control device, the third signal $S_3$ indicating allocated time and frequency resources for broadcasting of beacon signals;

the processor further is configured to allocate unique orthogonal time and frequency resources for at least one beacon signal $S_b$, wherein the unique orthogonal time and frequency resources are a subset of the allocated time and frequency resources for broadcasting of beacon signals;

the transceiver further is configured to transmit a first signal $S_1$ to the first communication device, the first signal $S_1$ indicating the allocated unique orthogonal time and frequency resources.

With this first implementation form using the third signal $S_b$ and the first signal $S_1$ it is possible to associate the allocated beacon signals with individual first communication devices. By defining unique orthogonal time and frequency resources to be a subset of the allocated time and frequency resources it can be made sure that the beacon signals transmitted from individual first communication devices (which can be controlled by different PLMNs) are orthogonal and will not cause any interference to each other.

In a second possible implementation form of a second communication device according to the first possible implementation form of the second aspect, the allocated unique orthogonal time and frequency resources are indicated in master information blocks, MIBs, or in system information blocks, SIBs.

The MIB/SIB defines a well known method of informing about radio network resources to all first communication devices which are controlled by second communication devices. This is the case when the first communication device acts as a user device and the second communication device acts as an access node. Therefore, all first communication devices will read MIB/SIB to find the resource information, such as orthogonal time and frequency resources for the beacon signals. Thereby, a convenient and well established method for signalling is provided meaning easy implementation and backwards compatibility with current wireless communication systems.

In a third possible implementation form of a second communication device according to the first or second possible implementation form of the second aspect or to the second communication device as such, the first signal $S_1$ further indicates a start point and an end point for the measurement time period.

The measurement time period defines the time period in which the first communication devices are transmitting beacon signals and the second communication devices are measuring the beacon signals by scanning. The measurement time period should be known by all communication devices in the wireless communication system and therefore the signaling with start point and end point information for the measurement time period is vital.

In a fourth possible implementation form of a second communication device according to any of the preceding possible implementation forms of the second aspect or to the second communication form as such, the second communication device is an access node device or a user device of the wireless communication system.

In a fifth possible implementation form of a second communication device according to any of the preceding possible implementation forms of the second aspect or to the second communication device as such, the second signal $S_2$ further indicates unique orthogonal time and frequency resources for the calculated received power or calculated pathloss.

The second communication device needs to inform the control device about the exactly used orthogonal time and frequency resources. This information uniquely associates the beacon signal transmission from a first communication device belonging to one PLMN and the measurement result from that specific orthogonal time and frequency resources measured/obtained by all other PLMNs (or rather the second communication devices of the other PLMNs) of the wireless communication system.

According to a third aspect of the invention, the above mentioned and other objectives are achieved with a control device for a wireless communication system, the control device comprising:

a processor, and a transceiver;

wherein the transceiver is configured to receive a second signal $S_2$ from a second communication device, the second signal $S_2$ indicating calculated received power or calculated pathloss at the second communication device for beacon signals broadcasted during a measurement time period, wherein the measurement time period is exclusively allocated for broadcasting of beacon signals in the wireless communication system;

wherein the processor is configured to estimate interference in the wireless communication system based on the calculated received power or calculated pathloss.

With a control device configured to receive calculated received power or calculated pathloss and to estimate interference based on the calculated received power or calculated pathloss according to embodiments of the present invention a number of advantages are provided.

The control device provides improved interference estimations. With improved interference estimation interference in the wireless communication system can be avoided or mitigated.

Further, with improved interference estimations also improved allocation of time and frequency resources and/or spectrum sharing is possible with the present control device. Thereby, improved performance and more efficient use of time and frequency resources and/or spectrum is possible in the wireless communication system.

In a first possible implementation form of a control device according to the third aspect, the processor further is configured to allocate time or frequency resources (or spectrum), based on the estimated interference, for a plurality of public land mobile networks, PLMNs, sharing time or frequency resources in the wireless communication system.

According to this implementation form the control device is able to allocate the time and frequency resources (or spectrum) for different PLMNs operating in the same area. This allocation may be based on the actual usage of the time and frequency resources (or spectrum). For example, if PLMN1 is using the time and frequency resources (or spectrum) everywhere inside an area and PLMN2 is using the time and frequency resources (or spectrum) in a hotspot area the control device can allocate the time and frequency resources (or spectrum) for each second communication device so that the interference between the PLMNs is below a predefined threshold.

In a second possible implementation form of a control device according to the first possible implementation form of the third aspect or to the control device as such, the processor further is configured to allocate time and frequency resources for broadcasting of beacon signals in the wireless communication system;

the transceiver further is configured to transmit a third signal $S_3$ to a second communication device, the third signal $S_3$ indicating the allocated time and frequency resources for broadcasting of beacon signals.

With this implementation form the control device is able to allocate time and frequency resources for each PLMN and send this allocation information to the second communication device. The control device is the only entity which has a capability of allocating time and frequency resources between different PLMNs since the control device has knowledge about the sharing PLMNs, resource sharing rules, and all the common parameters related to time and frequency resource sharing. Thereby, improved time and frequency resource sharing is possible in the wireless communication system.

In a third possible implementation form of a control device according to the first or second possible implementation form of the third aspect or to the control device as such, the second signal $S_2$ further indicates unique orthogonal time and frequency resources for the calculated received power or calculated pathloss.

The second communication device needs to inform the control device about the exact used orthogonal time and frequency resources. This information uniquely associates the beacon signal transmission from a first communication device belonging to one PLMN and the measurement result from that specific orthogonal time and frequency resources measured/obtained by all other PLMNs (or rather the second communication devices of the other PLMNs) of the wireless communication system.

According to a fourth aspect of the invention, the above mentioned and other objectives are achieved with a wireless communication system for a plurality of co-located public land mobile networks, PLMNs, sharing time or frequency resources of the wireless communication system, the wireless communication system comprising:

a plurality of first communication devices according to any possible implementation forms of the first aspect or to the first communication device as such, a plurality of second communication devices according to any possible implementation forms of the second aspect or to the second communication device as such, and at least one control device according to any possible implementation forms of the third aspect or to the control device as such.

According to a fifth aspect of the invention, the above mentioned and other objectives are achieved with a method for a first communication device for a wireless communication system, the method comprising:

broadcasting at least one beacon signal $S_b$ during a measurement time period, wherein the measurement time period is exclusively allocated for broadcasting of beacon signals, and wherein the at least one beacon signal $S_b$ is broadcasted in unique orthogonal time and frequency resources allocated for the first communication device.

In a first possible implementation form of a method according to the fifth aspect, the method further comprises receiving a first signal $S_1$ from a second communication device, the first signal $S_1$ indicating the unique orthogonal time and frequency resources allocated for the first communication node.

In a second possible implementation form of a method according to the first possible implementation form of the fifth aspect or to the method as such, the first signal $S_1$ further indicates a start point and an end point for the measurement time period.

In a third possible implementation form of a method according to the first or second possible implementation form of the fifth aspect or to the method as such, the first communication device is an access node device or a user device of the wireless communication system.

According to a sixth aspect of the invention, the above mentioned and other objectives are achieved with a method for a second communication device for a wireless communication system, the method comprising:

scanning time and frequency resources of the wireless communication system during a measurement time period, wherein the measurement time period is exclusively allocated for broadcasting of beacon signals, and wherein each beacon signal is broadcasted by a first communication device in unique orthogonal time and frequency resources allocated for the first communication device;

calculating received power or pathloss for the beacon signals; and forwarding a second signal $S_2$ to a control device of the wireless communication system, wherein the second signal $S_2$ indicates the calculated received power or calculated pathloss.

In a first possible implementation form of a method according to the sixth aspect, when the second communication device is an access node device, the method further comprises receiving a third signal $S_3$ from the control device, the third signal $S_3$ indicating allocated time and frequency resources for broadcasting of beacon signals;

allocating unique orthogonal time and frequency resources for at least one beacon signal $S_b$, wherein the unique orthogonal time and frequency resources are a subset of the allocated time and frequency resources for broadcasting of beacon signals;

transmitting a first signal $S_1$ to the first communication device, the first signal $S_1$ indicating the allocated unique orthogonal time and frequency resources.

In a second possible implementation form of a method according to the first possible implementation form of the sixth aspect, the allocated unique orthogonal time and frequency resources are indicated in master information blocks, MIBs, or in system information blocks, SIBs.

In a third possible implementation form of a method according to the first or second possible implementation form of the sixth aspect or to the method as such, the first signal $S_1$ further indicates a start point and an end point for the measurement time period.

In a fourth possible implementation form of a method according to any of the preceding possible implementation forms of the sixth aspect or to the method as such, the second communication device is an access node device or a user device of the wireless communication system.

In a fifth possible implementation form of a method according to any of the preceding possible implementation forms of the sixth aspect or to the method as such, the second signal $S_2$ further indicates unique orthogonal time and frequency resources for the calculated received power or calculated pathloss.

According to a seventh aspect of the invention, the above mentioned and other objectives are achieved with a method for a control device for a wireless communication system, the method comprising:

receiving a second signal $S_2$ from a second communication device, the second signal $S_2$ indicating calculated received power or calculated pathloss at the second communication device for beacon signals broadcasted during a measurement time period, wherein the measurement time period is exclusively allocated for broadcasting of beacon signals in the wireless communication system;

estimating interference in the wireless communication system based on the calculated received power or calculated pathloss.

In a first possible implementation form of a method according to the seventh aspect, the method further comprises allocating time or frequency resources, based on the estimated interference, for a plurality of public land mobile networks, PLMNs, sharing time or frequency resources in the wireless communication system.

In a second possible implementation form of a method according to the first possible implementation form of the seventh aspect or to the method as such, the method further comprises allocating time and frequency resources for broadcasting of beacon signals in the wireless communication system;

transmitting a third signal $S_3$ to a second communication device, the third signal $S_3$ indicating the allocated time and frequency resources for broadcasting of beacon signals.

In a third possible implementation form of a method according to the first or second possible implementation form of the seventh aspect or to the method as such, the second signal $S_2$ further indicates unique orthogonal time and frequency resources for the calculated received power or calculated pathloss.

The advantages of the methods according to the fifth, sixth and seventh aspects are the same as those for the corresponding device claims according to the first, second, and third aspects.

The embodiments of the present invention also relates to a computer program, characterized in code means, which when run by processing means causes said processing means to execute any method according to the embodiments of the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
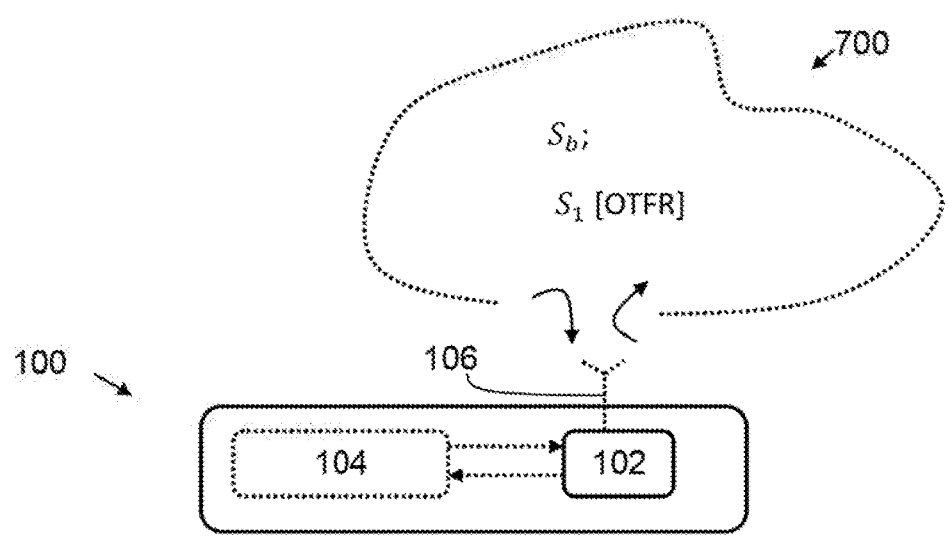
FIG. 1 shows a first communication device according to an embodiment of the present invention.

FIG. 1 shows a first communication device 100 according to an embodiment of the present invention. The first communication device 100 comprises a transceiver 102 configured to receive and transmit communication signals. In this particular example the first communication device 100 also comprises an optional processor 104 (dashed lines) which is communicably coupled to the transceiver 102 with suitable communication means illustrated with dashed arrows. The transceiver 102 is in this particular example further coupled to an antenna unit 106 (dashed lines) for wireless communications in a wireless communication system 700. The transceiver 102 of the first communication device 100 is configured to broadcast beacon signals $S_b$ during a measurement time period of the wireless communication system 700 using the antenna unit 106. The measurement time period is exclusively allocated for broadcasting of beacon signals in the wireless communication system 700. This means that other types of transmissions in the wireless communication system 700 are paused or stayed or must be non-overlapping (non-interfering) during the measurement time period. Further, the beacon signal $S_b$ is broadcasted by the transceiver in unique Orthogonal Time and Frequency Resources (OT-FRs) allocated for the first communication device 100. It is noted that the first communication device 100 may comprise further suitable means, units, components, elements, and devices as stated later in the present description.

In an embodiment of the present invention, the transceiver 102 of the first communication device 100 is further configured to receive a first signal $S_1$ from a second communication device 300 of the wireless communication system. The first signal s indicates the OTFR allocated for the first communication device 100. The allocated OTFR is used by the first communication device 100 for beacon signal $S_b$ transmissions. The first signal $S_1$ is in this particular embodiment received by means of the antenna unit 106.

In yet an embodiment of the present invention the first signal $S_1$ further indicates the start point and end point of the measurement time period. This signalling may be needed if the allocation in time of the measurement time period is not known beforehand to the first communication device 100, such as in static allocation of resources. Thereby, this embodiment allows dynamic or semi-dynamic allocation of the measurement time periods to first communication devices. It is to be noted though that the information about the start point and end point of the measurement time period may be comprised in other signals than in the first signal $S_1$. Also the start point and end point of the measurement time period can be understood as part of the time and frequency resource allocation for the beacon signal $S_b$ implying implicit signalling of the start point and end point of the measurement time period.

Figure 2:
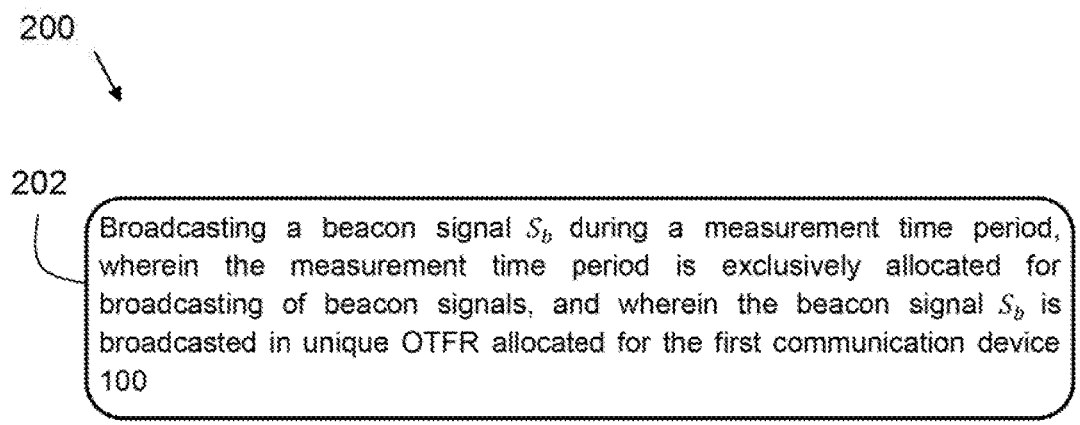
FIG. 2 shows a method according to an embodiment of the present invention.

FIG. 2 shows a corresponding method 200 which in this particular embodiment is executed in a first communication device 100, such as the one shown in FIG. 1. The method 200 comprises the step of broadcasting 202 at least one beacon signal $S_b$ during a measurement time period. As mentioned, the measurement time period is exclusively allocated for broadcasting of beacon signals. Further, the beacon signal $S_b$ is broadcasted in unique OTFR allocated for the specific first communication device 100.

Figure 3:
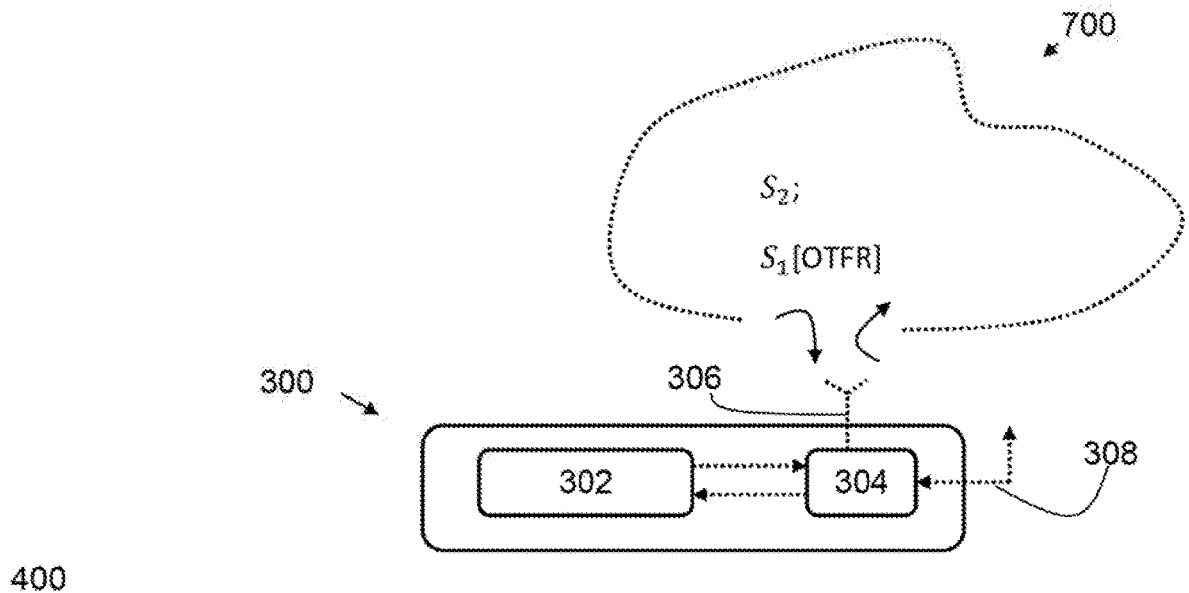
FIG. 3 shows a second communication device according to an embodiment of the present invention.

FIG. 3 shows a second communication device 300 according to an embodiment of the present invention. The second communication device 300 comprises a processor 302 and a transceiver 304. The processor 302 and the transceiver 304 are communicably coupled to each other with suitable communication means (illustrated with dashed arrows). The transceiver 304 is in this particular example further coupled to an antenna unit 106 (dashed lines) for wireless communications in the wireless communication system 700. The transceiver 304 may also be coupled to a wired connection 308 for wired communications, such as e.g. a backhaul of the wireless communication system 700.

The transceiver 304 of the second communication device 300 is configured to scan known time and frequency resources of the wireless communication system 700 during the measurement time period. The transceiver 304 forwards the result of the scanning to the processor 302 of the second communication device 300. The processor 302 is configured to calculate received power and/or pathloss for the received beacon signals based on the scanning result. Known methods and algorithms for power and/or pathloss calculations can be applied by the processor 302. For example, the pathloss (L) may be defined as L=Pt/Pr, where Pt is the transmitted power and Pr is the measured received power. Both transmitted and received powers are measured at the antenna port(s) of the transmitter and receiver. The transceiver 304 is further configured to forward a second signal $S_2$ to a control device 500 of the wireless communication system 700. The second signal $S_2$ indicates the calculated received power or calculated pathloss received from the processor 302.

The second communication device 300 hence scans through all time and frequency resources and estimates the received power level from e.g. all resource blocks or resource elements or other resource units of the wireless communication system 700. The second communication device 300 may collect data from one measurement time period and send/forward the measurement data to the control device 500.

In an alternative the second communication device 300 averages measurements over several measurement time periods and forwards the averaged data to the control device 500. The sent data can e.g. be estimated power per resource element or the pathloss (or coupling loss) per resource element. In the case of estimated power the second communication device 300 calculates the pathloss by knowing the transmitting power of the transmitting first communication device 100. In the case of pathloss the second communication device 300 may calculate the pathloss per resource element.

In an embodiment of the present invention the first signal $S_1$ further indicates a start point and an end point for the measurement time period as mentioned above. The second communication device 300 therefore instructs or informs the first communication device(s) about the time interval of the measurement time period. It is however needed that the duration of the measurement time periods in the wireless communication system 700 are synchronised between all radio access networks being part of the wireless communication system 700 in this respect. The duration of the measurement time periods can be centrally controlled by the control device 500 which is described more in the following description.

Figure 4:
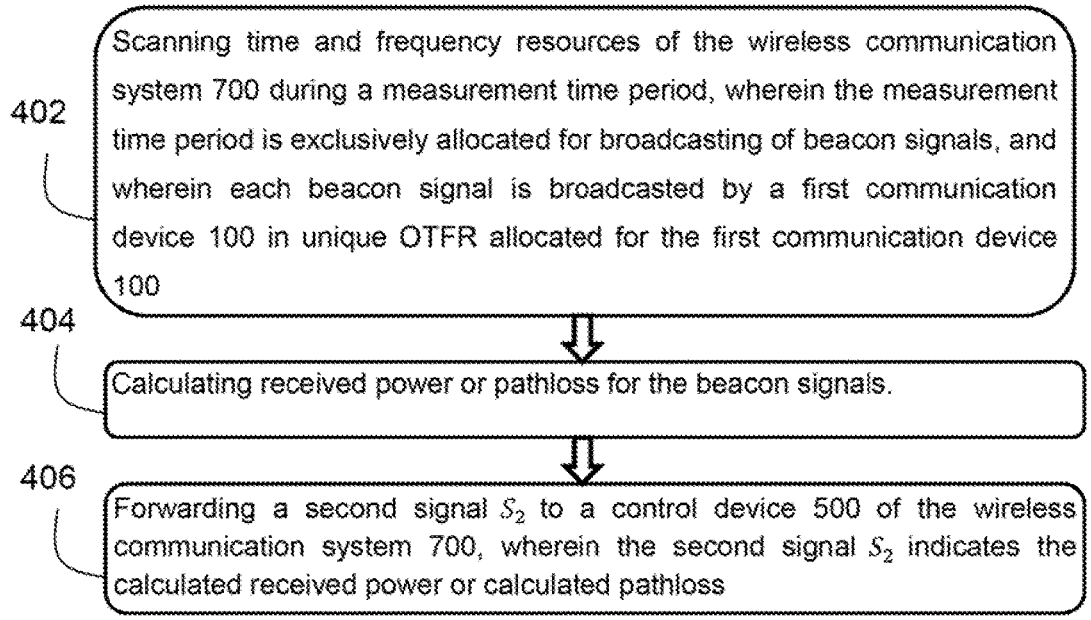
FIG. 4 shows a further method according to a further embodiment of the present invention.

FIG. 4 shows a corresponding method 400 which in this particular embodiment is executed in a second communication device 300, such as the one shown in FIG. 3. The method 400 comprises the step of scanning 402 time and frequency resources of the wireless communication system 700 during a measurement time period. The method 400 further comprises the step of calculating 404 received power or pathloss for the beacon signals. The method 400 further comprises the step of forwarding 406 a second signal $S_2$ to a control device 500 of the wireless communication system 700. The second signal $S_2$ indicates the calculated received power or calculated pathloss.

The first communication device 100 and the second communication device 300 may according to an embodiment be an Access Node (AN) or a User Device (UD) of the wireless communication system 700. Examples of access nodes are base stations, remote radio heads, relay nodes, access points, etc. Examples of user devices are user terminals, mobile stations, mobile users, user equipments, machine-to-machine devices, etc.

Figure 5:
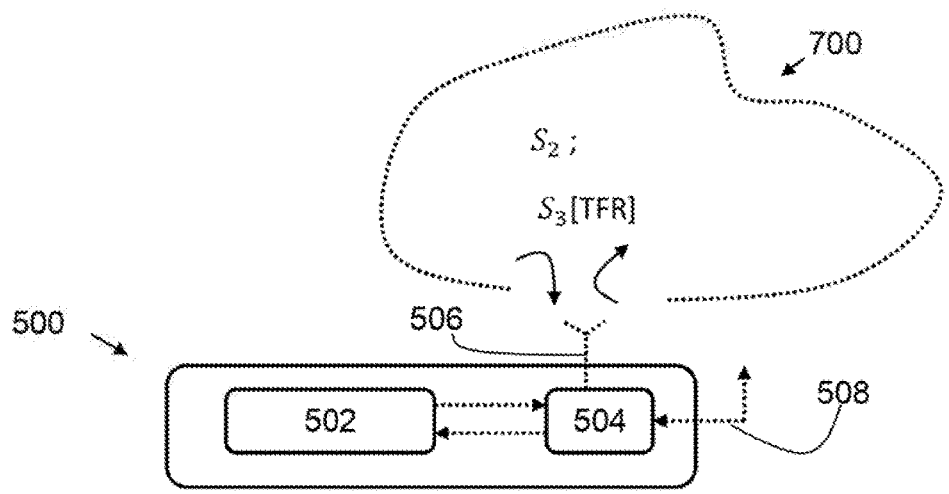
FIG. 5 shows a control device according to an embodiment of the present invention.

FIG. 5 shows a control device 500 according to an embodiment of the present invention. The control device 500 comprises a processor 502 and a transceiver 504. The processor 502 and the transceiver 504 are communicably coupled to each other with suitable communication means (illustrated with dashed arrows). The transceiver 504 is in this particular example further coupled to a wired connection 308 for wired communications, such as e.g. a wired backhaul of the wireless communication system 700. The backhaul can connect the transceiver 504 of the control device 500 with the transceiver 304 of the second communication device 300. The transceiver 504 may also be connected to an antenna unit 506 for wireless communications.

The transceiver 504 of the control device 500 is configured to receive a second signal $S_2$ forwarded from a second communication device 300 as described above. The second signal $S_2$ indicates calculated received power and/or calculated pathloss at the second communication device 300 for beacon signals broadcasted during a measurement time period. The transceiver 504 forwards the calculated received power and/or calculated pathloss to the processor 502 of the control device 500 via the communication means. The processor 502 is configured to estimate interference in the wireless communication system 700 based on the calculated received power and/or calculated pathloss. Both or only one of the calculated received power or calculated pathloss may be comprised in the second signal $S_2$. Further, both or only one of the calculated received power or calculated pathloss may be used by the control device 500 for estimating the interference in the wireless communication system 700.

The interference can be estimated by collecting measurement data for a certain time period, after which the collected measurement data is used for calculating the pathloss values and to estimate the interference. The time period for measurements has to be long enough in order to have a reliable estimation of the interference. Therefore, measurement data for more than one measurement time period can be used in interference estimations.

Figure 6:
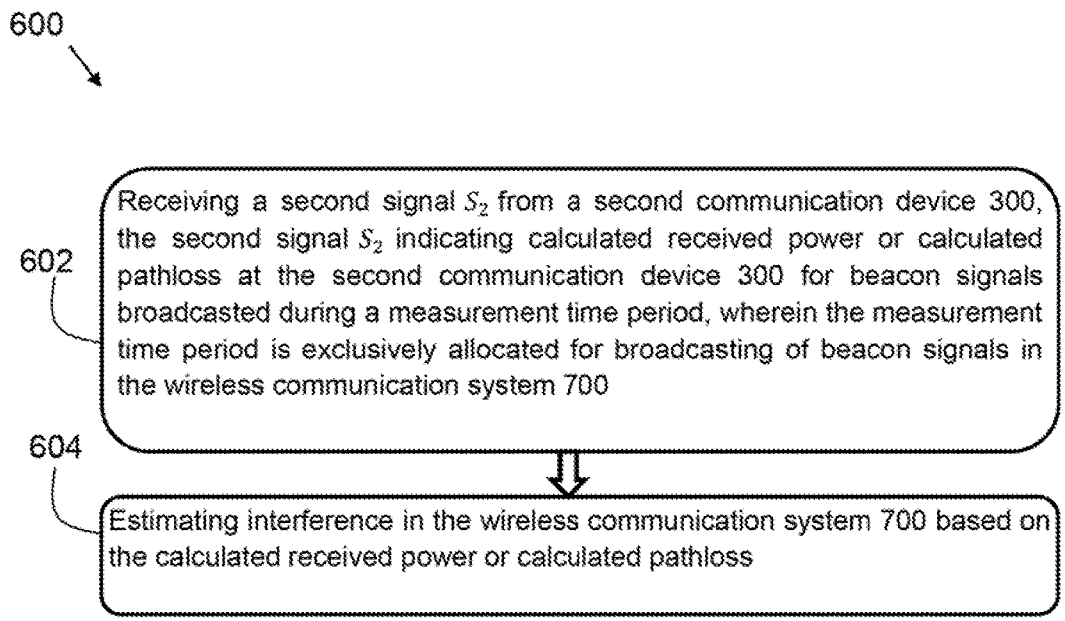
FIG. 6 shows a further method according to a further embodiment of the present invention.

FIG. 6 shows a corresponding method 600 which in this particular embodiment is executed in a control device 500, such as the one shown in FIG. 5. The method 600 comprises the step of receiving 602 a second signal $S_2$ from a second communication device 300. The second signal $S_2$ indicates calculated received power or calculated pathloss at the second communication device 300 for beacon signals broadcasted during a measurement time period. The method 600 further comprises the step of estimating 604 interference in the wireless communication system 700 based on the calculated received power and/or calculated pathloss. The present control device 500 may be a spectrum manager or any other suitable network control node.

The interference estimated by the control device 500 can be used in a number of different ways in the wireless communication system 700.

In an embodiment of the present invention, the processor 502 of the control device 500 is further configured to allocate time or frequency resources. The allocated time and/or frequency resources are determined based on the estimated interference and are allocated for a plurality of PLMNs (or so called operators) sharing time and frequency resources (or spectrum) in the wireless communication system 700. Thus, in this embodiment the control device 500 acts as a spectrum manager for the wireless communication system 700.

In another embodiment of the present invention, the processor 502 of the control device 500 is also configured to allocate time and frequency resources for broadcasting of beacon signals in the wireless communication system 700. Therefore, the transceiver 504 further is configured to transmit a third signal $S_3$ to the second communication device 300. The third signal $S_3$ indicating the allocated time and frequency resources dedicated for the broadcasting of beacon signals by the first communication device(s) 100.

Figure 7:
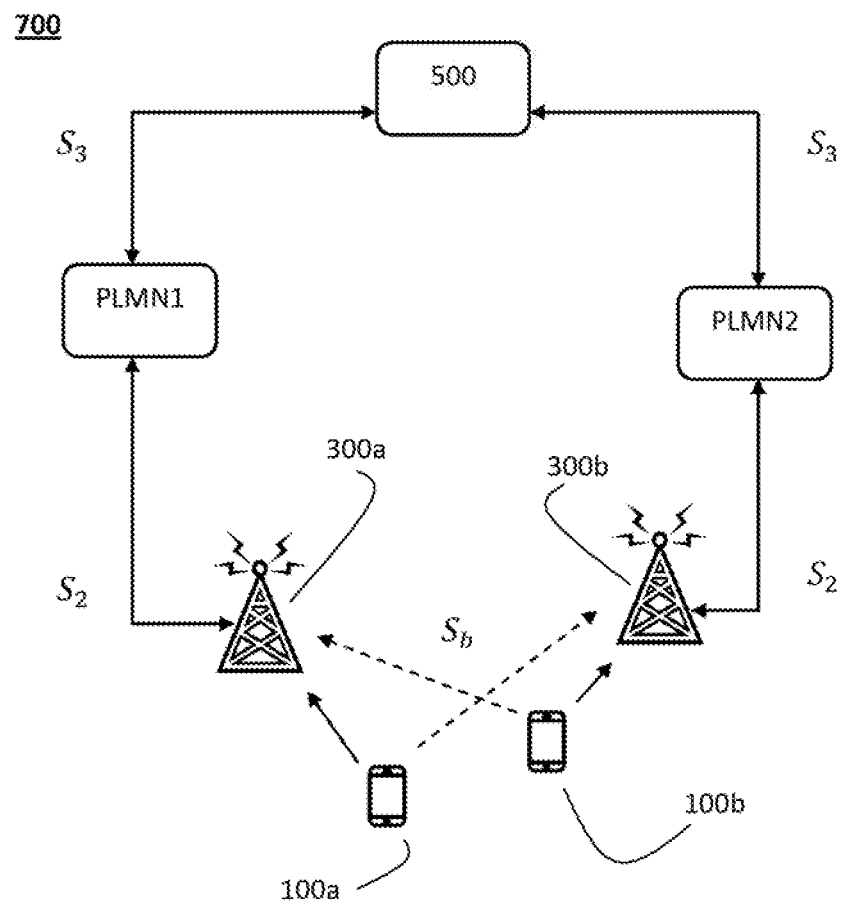
FIG. 7 illustrates a wireless communication system according to an embodiment of the present invention.

FIG. 7 illustrates a wireless communication system 700 according to an embodiment of the present invention. The wireless communication system 700 includes in this particular example two co-located PLMNs, i.e. PLMN1 and PLMN2, sharing time and frequency resources (and spectrum) of the wireless communication system 700. The wireless communication system 700 further comprises an access node (e.g. a base station or an access point) associated with the first PLMN1 and acting as a second communication device 300*a*. The wireless communication system 700 further comprises a user device (e.g. a mobile terminal) associated with the first PLMN1 and acting as a first communication device 100*a*. The wireless communication system 700 further comprises an access node associated with the second PLMN2 and acting as a second communication device 300*b*. The wireless communication system 700 further comprises a user device associated with the second PLMN2 and acting as a first communication device 100*b*. User devices 100*a* and 100*b* broadcasts beacon signals (illustrated with arrows) during measurement time periods according to embodiment of the present invention. The beacon signals are received by its respective access node 300*a* and 300*b* (illustrated with full lines) and by the access node of the other PLMN (illustrated with dashed lines). The access nodes 300*a* and 300*b* calculates the received power and/or pathloss for both user devices 100*a* and 100*b*, respectively. The measurement time period may be seen as a pause in transmission allocated in advance. The exact time instants or intervals of the measurement time periods are known by all PLMNs of the wireless communication system 700.

FIG. 7 also illustrates time and frequency resource sharing scenario where the two PLMNs, i.e. PLMN1 and PLMN2, share the same time and frequency resources of the wireless communication system 700. The sharing of the time and frequency resources is allocated by a spectrum manager which in this particular example is acting as a control device 500. The calculated power and/or pathloss are transmitted from the access nodes 300*a* and 300*b* in second signals $S_2$ to the spectrum manager 500. Therefore, the access nodes 300*a* and 300*b* and the spectrum manager 500 are configured to communicate with each other by means of suitable communication means and protocols known in the art.

The spectrum manager 500 estimates interference in the wireless communication system 700 based on the power and/or pathloss calculated by the access nodes 300*a* and 300*b* of each PLMN. Hence, the interference between the user devices 100*a* and 100*b* and the access nodes 300*a* and 300*b* is estimated by the spectrum manager 500 based on the received calculated power and/or pathloss. The pathloss (e.g. given in dB) may be defined as the ratio between transmitted and received power between antenna connectors of an access node and a user device, or vice versa. The spectrum manager 500 is further configured to allocate time and frequency resources of the wireless communication system 700 based on the estimated interference.

The allocated time and frequency resources are transmitted in third signals $S_3$ from the spectrum manager 500 to the access nodes 300*a* and 300*b* and/or some other control node of the wireless communication system 700. The allocated time and frequency resources may in a first case be dedicated for the transmission of broadcast beacon signals during measurement time periods. However, the allocated time and frequency resources or spectrum may in a second case be dedicated for other traffic, i.e. general allocation of recourses in the wireless communication system 700 for different types of transmissions, such as data traffic, control signalling, etc.

Figure 8:
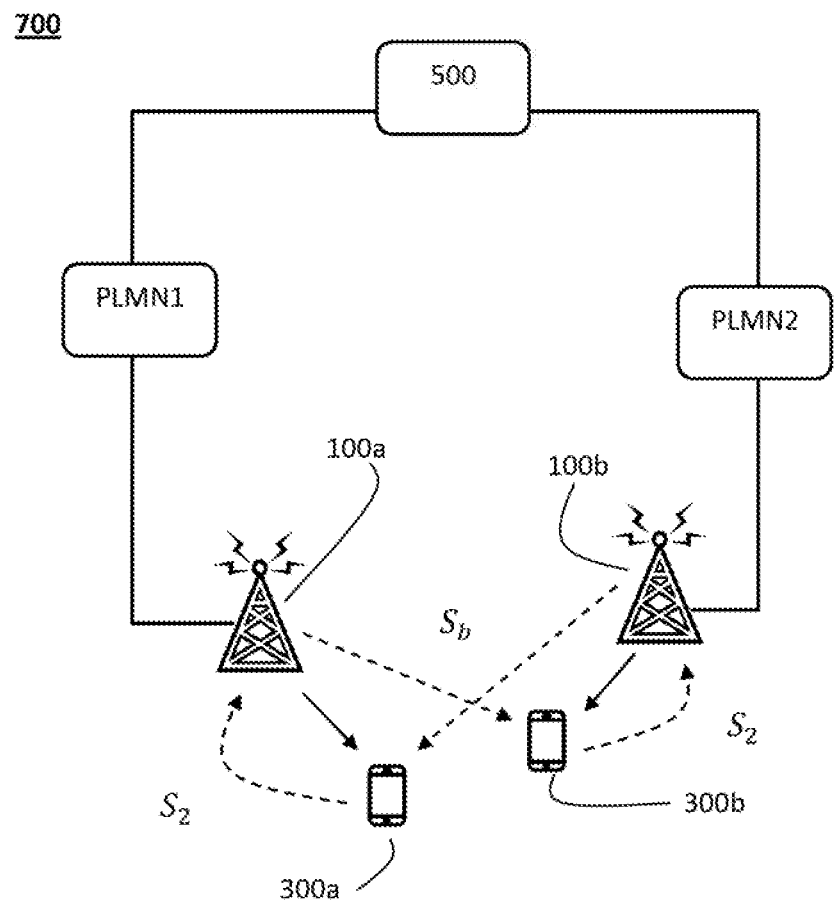
FIG. 8 illustrates another wireless communication system according to an embodiment of the present invention.

FIG. 8 shows the wireless communication system 700 in FIG. 7. However, in this example the access nodes instead act as first communication devices 100*a* and 100*b*. Further, the user devices instead act as second communication devices 300*a* and 300*b*. Therefore, the access nodes 100*a* and 100*b* broadcast the beacon signals during measurement time periods while the user devices 300*a* and 300*b* receive the beacon signals and calculates the received power and/or pathloss. The user devices 300*a* and 300*b* thereafter transmit the calculated received power and/or pathloss, e.g. via the access nodes 300*a* and 300*b*, to the spectrum manager 500 for further processing as described above.

It should be noted that according to yet another embodiment of the present invention the access nodes and the user devices act as both a first communication device 100 and a second communication device 300. Typically, in cellular systems both the uplink and downlink interference can be estimated with this embodiment. It should however be noted that if it is assumed that the pathloss is the same for the uplink and the downlink only the pathloss calculations for the uplink or the downlink has to be performed.

Figure 9:
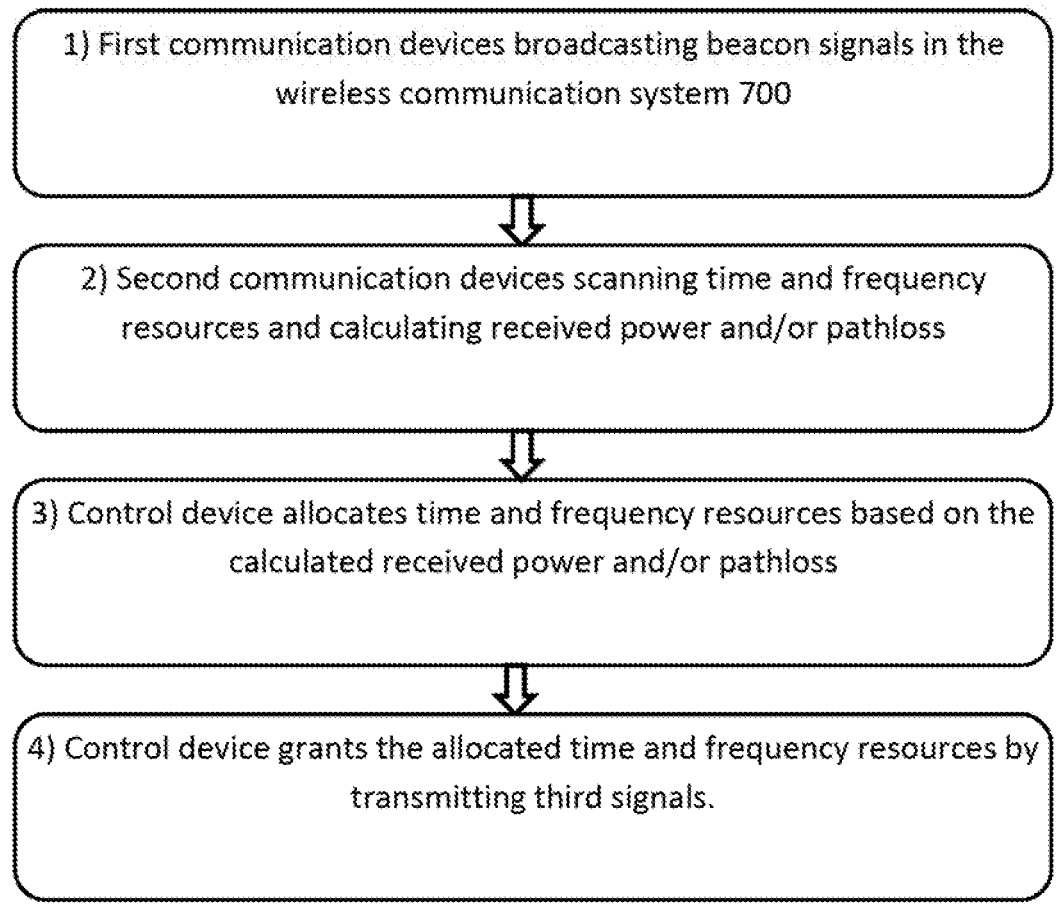
FIG. 9 shows a flowchart for resource allocation according to an embodiment of the present invention.

Furthermore, the time and frequency sharing process comprises according to an embodiment of the present invention mainly four steps as illustrated in the flowchart in FIG. 9. In the example in FIG. 9 the first communication devices 100 act as user devices and the second communication devices 300 act as access nodes.

In step 1 the first communication devices broadcast beacon signals in the wireless communication system 700. The beacon signals are broadcasted in orthogonal time and frequency resources during measurement time periods. Orthogonal time and frequency resources mean that they are exclusive for each first communication device 100. Also, codes and spatial aspects may be considered for non-interfering transmissions which is well known in the art.

In step 2 the second communication devices of all PLMNs sharing spectrum scan the time and frequency resources during the measurement time periods. In step 2 the second communication devices also calculates the received power and/or path loss for all received bacon signals. It is therefore assumed time-synchronization between different PLMNs in this scenario. Therefore, if there are 100 first communication devices 100 and 20 second communication devices 300, 2000 pathloss values are calculated.

In step 3 after that the second step 2, the control device 500 receives the calculated received power and/or pathloss and estimates interference based on the calculated received power and/or pathloss from the second communication devices. The control device 500 further in step 3 allocates time and frequency resources of the wireless communication system 700 for the PLMNs based on the estimated interference.

Finally, in step 4 the allocated time and frequency resources are granted to the second communication devices of the different PLMNs by being indicated in third signals $S_3$ to the second communication devices.

The spectrum allocation process may in this embodiment be considered to be semi-static. The measured power levels and/or respective pathloss are used for spectrum allocation after the interference estimation. The actual usage of new time and frequency allocations is possible after enough interference estimates have been produced. This process may take from several minutes to hours and sometime days.

Moreover, in an embodiment of the present invention a so called forgetting factor can be utilized by the control device 500 so that the most recent calculated received power and/or pathloss are weighed more than older calculated received power and/or pathloss in the time and frequency allocation algorithm. Choosing an appropriate forgetting factor depends e.g. on the interval of time and frequency re-sharing in the wireless communication system 700. Furthermore, the second communication devices could report their respective load status to the control device 500 so that some level of fairness can be achieved between the PLMNs. Thereby, usage of available time and frequency resources as well as spatial resources can be optimized more efficiently according to this embodiment.

Utilization of a forgetting factor according to the described embodiment means that the control device 500 takes into account the aging aspect of the received power and/or pathloss calculations. Therefore, the control device 500 carries out the time and frequency allocation by weighting the most recent calculated received power and/or pathloss more than the older ones. This means that the most recently made calculated received power and/or pathloss are considered to be more important. Hence, the processor 502 of the control device 500 is further configured to use a forgetting factor when estimating interference and/or allocating time and frequency resources according to this embodiment.

Figure 10:
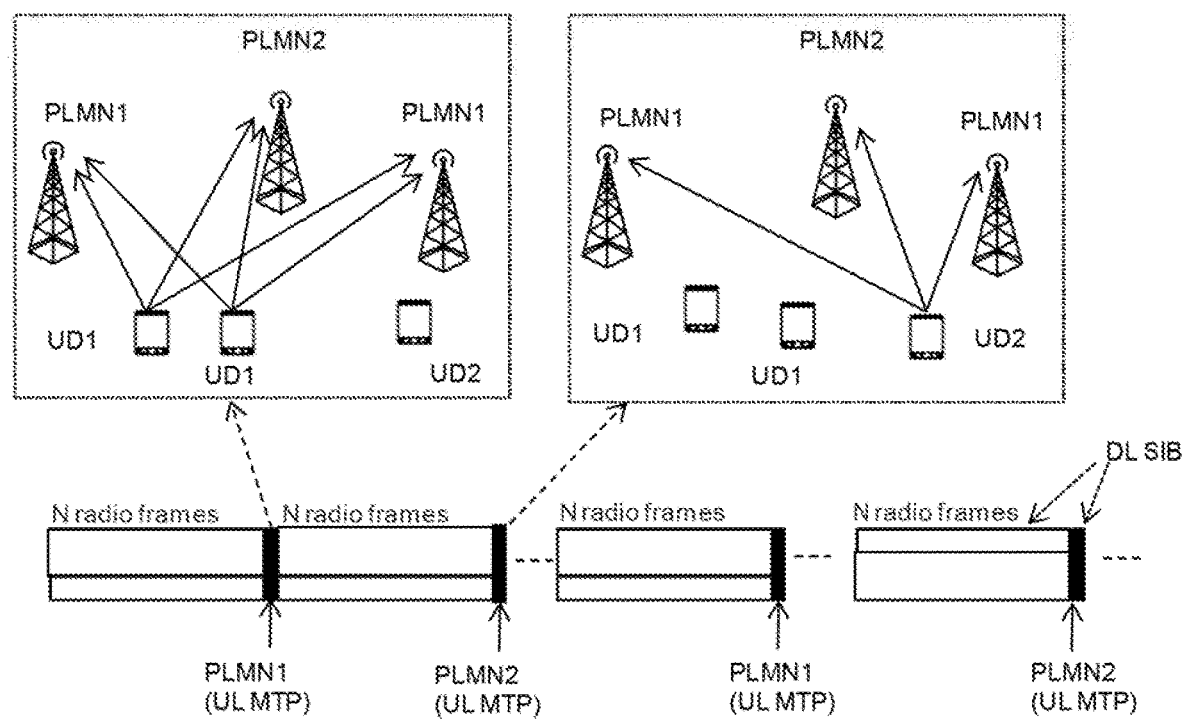
FIG. 10 illustrates allocation of time and frequency resources according to an embodiment of the present invention.
Figure 12:
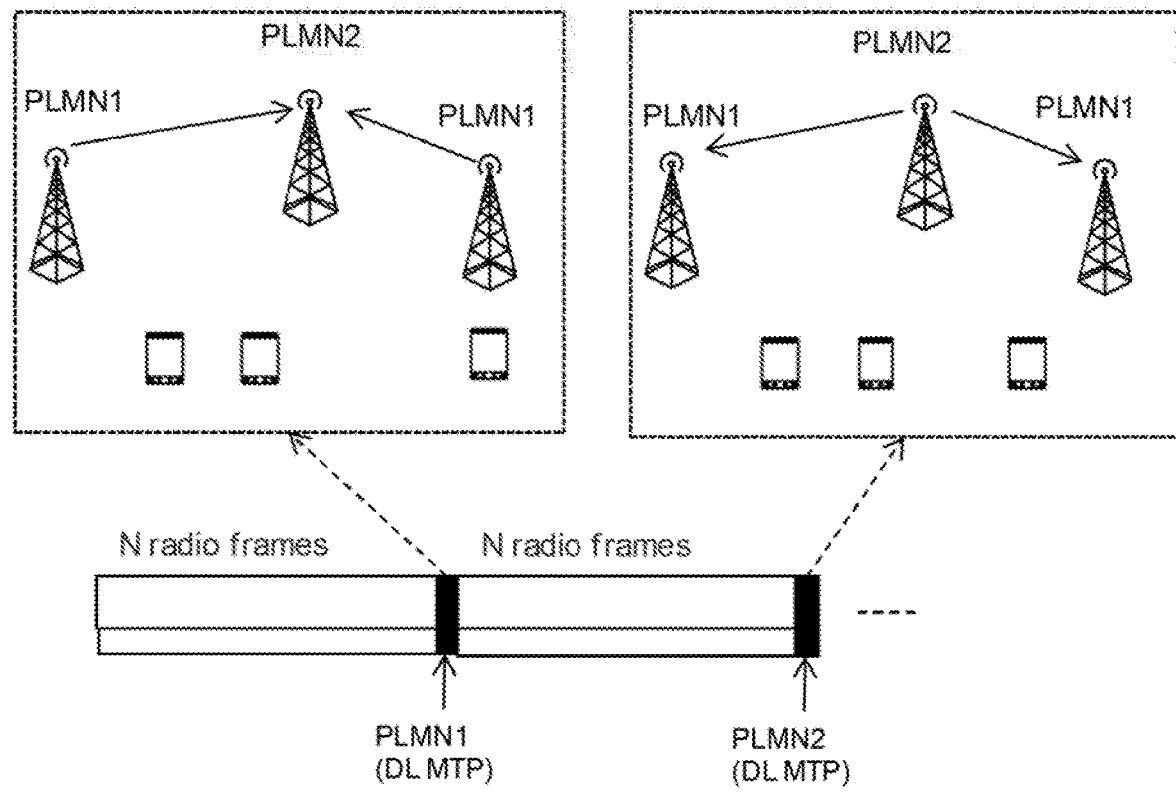
FIG. 12 illustrates yet another allocation of time and frequency resources according to an embodiment of the present invention.

In embodiments of the present invention the air interface framing includes Uplink (UL) and Downlink (DL) measurement time periods as illustrated in FIG. 10 and FIG. 12.

FIG. 10 illustrates the segmentation of the air interface time and frequency resources for measurement time periods. The uplink Measurement Time Period (MTP) is used after for every N radio frames, where N is integer variable and defined by the radio access network. The uplink measurement time periods are allocated among the PLMNs taking part of the time and frequency sharing, in this example PLMN1 and PLMN2. The UL measurement time periods are allocated for either PLMN1 or PLMN2, i.e. time multiplexing. When the measurement time period is allocated for PLMN1 the User Devices (UDs) UD1$s$ belonging to PLMN1 broadcast beacon signals. The UD which belongs to PLMN1, i.e. UD2, is silent. The broadcast beacon signals transmitted by UD1$s$ are received by all PLMNs of the wireless communication system 700. When UD2 broadcast beacon signals the UD1$s$ are silent since the measurement time period is allocated for PLMN2. The broadcast beacon signal transmitted by UD2 is also received by all PLMNs of the wireless communication system 700. It is also illustrated in FIG. 10 that DL SIBs can be allocated to measurement time periods and/or radio frames allocated for non-measurement time periods. This is illustrated with dashed arrows in FIG. 10.

The control device 500 (not shown in FIG. 10) allocates unique beacon signal resources, i.e. time and frequency resources, for every PLMN. Each PLMN is responsible for sharing unique beacon signal resources among the connected UDs. The latter allocation of the beacon signal resources may depend on the geographical location, number of UDs, radio propagation environment, etc.

Alternatively, the control device 500 can allocate beacon signal time and frequency resources between designated UDs. In this case the control device 500 can share beacon signal time and frequency resources between designated UDs. However, this requires information about connected UDs from the different PLMNs.

These assigned beacon signal time and frequency resources are unique identifiers of the UDs so the spectrum manager can share beacon signal resources between designated UDs. The beacon signal resources allocated to ANs/UDs for beacon transmission are also used for identifying the mentioned ANs/UDs. For example, when a certain resource is allocated for a UD the wireless communication system (all PLMNs and access nodes) identifies the said UD.

The allocation of the time and frequency resources for beacon signals can be done in different ways. It is possible to allocate one or more beacon signals carried by different subcarriers for one UD within one measurement time period in order to obtain frequency diversity. It is also possible to allocate beacon signals in subsequent measurement time periods in order to obtain time diversity.

Furthermore, it is also possible to allocate only one time and frequency resource for one UD in order to maximize the beaconing capacity. UDs of several PLMNs can be allocated to one measurement time period or a measurement time period can have allocations for only one PLMN which is illustrated in FIG. 11, where uplink beacon allocation between different PLMNs is shown.

Figure 11:
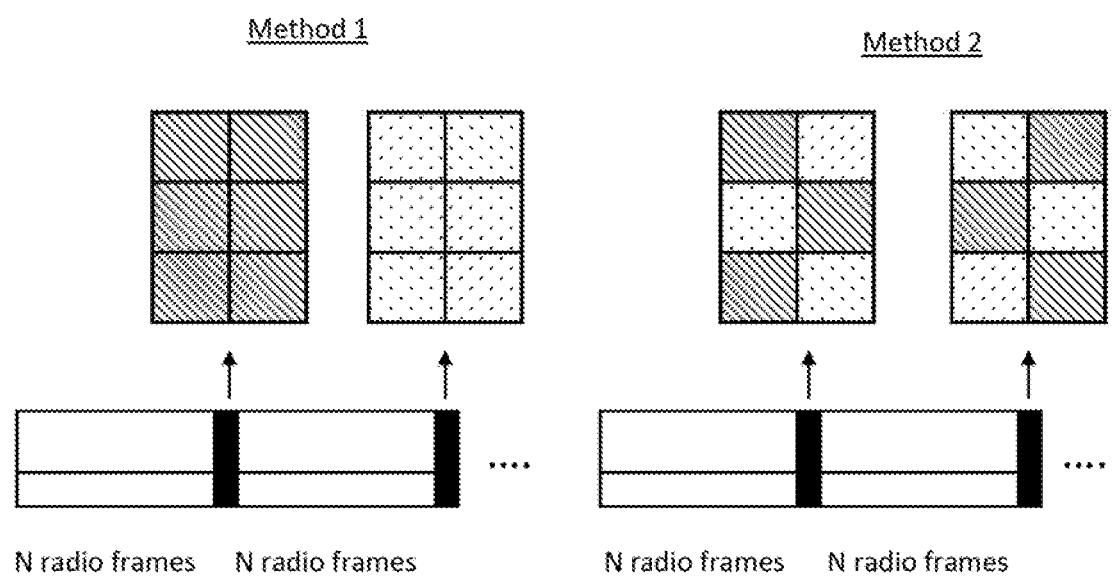
FIG. 11 illustrates another allocation of time and frequency resources according to an embodiment of the present invention.

In FIG. 11 two different PLMNs are sending beacon signals in measurement time periods. In method 1 the uplink measurement time periods are time-multiplexed while in method 2 the beacon signals are transmitted simultaneously according to a disjoint frequency-hopping pattern. In both methods two measurement time periods are depicted. In the first measurement time period in method 1 PLMN1 is stopping its transmissions while PLMN2's UDs are transmitting beacon signals and both PLMNs' ANs are receiving. In the second measurement time period in method 1 PLMN2 is stopping its transmissions while PLMN1's UDs are transmitting beacon signals. Hence, different PLMNs are transmitting in different measurement time periods. In method 2 both PLMNs are transmitting in the same measurement time period but the separation of PLMNs is done in the time and frequency domain as shown. Which of method 1 or method 2 is better depends on radio channel, mobile speed, and other radio propagation aspects.

Moreover, the allocation of beacon signal time and frequency resources may also depend on the shared bandwidth and the number of UDs. Certain radio frames may also include a downlink system information block. As currently in Long Term Evolution (LTE), UDs (or User Equipments in LTE terminology) already connected to the wireless communication system 700 can obtain downlink bandwidth by receiving Master Information Blocks (MIBs) and/or System Information Blocks (SIBs). Therefore, according to this embodiment the allocated orthogonal time and frequency resources are indicated in master information blocks or in system information blocks.

Similar mechanism can be utilized for informing UDs about changes in broadcast signal resource allocations between different PLMNs. The UDs can be mandated to receive MIB/SIB messages with defined time intervals. In an alternative, the UDs can be reached, e.g. with paging or similar procedure for receiving updated system information from the radio access network. By reading the downlink MIB/SIBs the UDs are able receive information on current operating bands allocated to their respective PLMN.

In Time Domain Duplex (TDD) mode, spectrally adjacent PLMN might cause severe access AN-to-AN or UD-to-UD interference to each other because of conflicting transmission directions. This situation takes place when the AN or the UD of a given PLMN receives during the same timeframe of a spectrally and geographically adjacent AN or UD transmitting. This is the case when the transmissions of two PLMNs are not synchronized or when the uplink/downlink ratio in different PLMN's radio access network is different.

The ANs and UDs which are potentially vulnerable to adjacent PLMN interference can be detected by measuring the coupling losses between the ANs or UDs. The UL/DL measurement time periods (i.e., the time periods between the UL and DL transmission on a TDD network) can be also used for detecting the adjacent channel interference. The ANs/UNs collect the data and send the data to the control device 500 which analyses the information and takes the information into account in the time and frequency allocation process. The control device 500 can for example identify situations where unaligned uplink/downlink resource allocations will cause increased interference in the wireless communication system 700.

Figure 13:
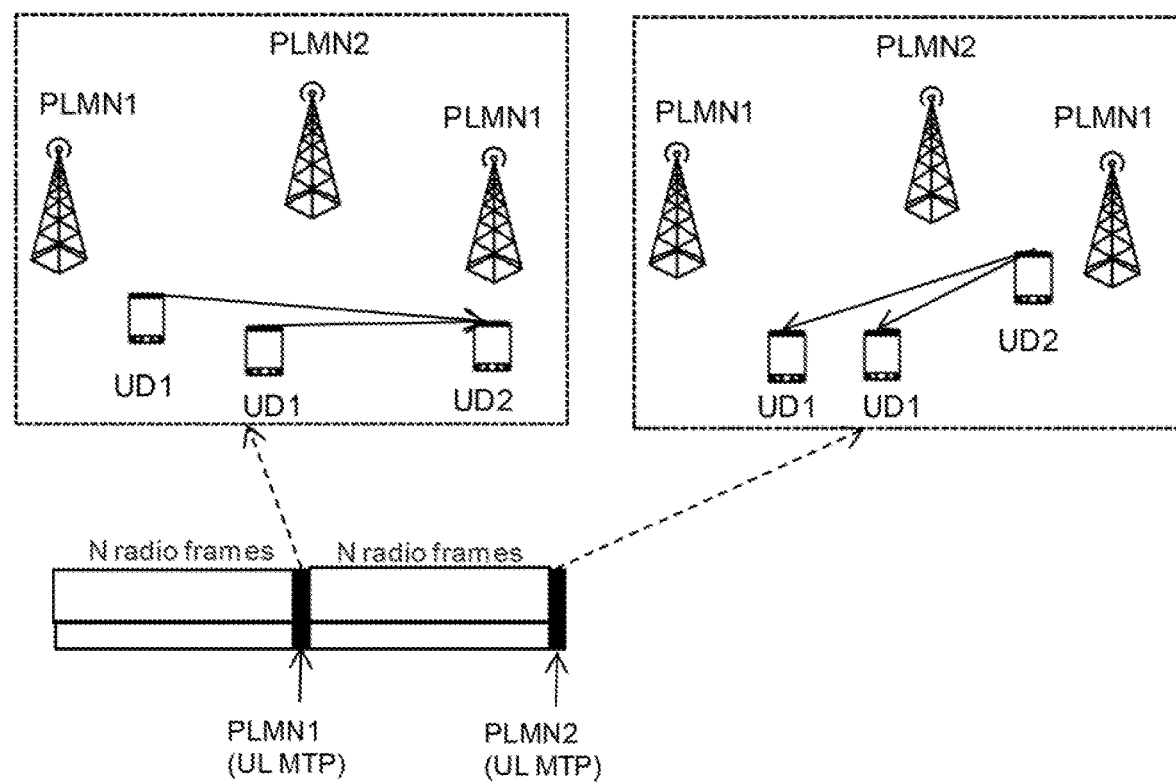
FIG. 13 illustrates yet another allocation of time and frequency resources according to an embodiment of the present invention.

This inter-PLMN measurement functionally in DL and UL directions are depicted in FIG. 12 and FIG. 13, respectively. For the time and frequency resource allocation purposes the UD measurements are not needed since the probability for the UD-to-UD interference is less significant than the AN-to-AN interference.

In FIG. 12 the concept of using measurement time periods is applied to the case where two PLMNs' ANs are measuring each other while the UDs are silent. In the first measurement time period the PLMN1 ANs are transmitting with unique beacon allocations and PLMN2 ANs are receiving and in the next measurement time period the other way around is the case. The measurements can be used for detecting possible AN-to-AN interference.

In FIG. 13 the concept of using measurement time periods is applied to the case where two PLMNs' UDs are measuring each other while the ANs are silent. FIG. 13 shows the same as shown in FIG. 12 with the exception that the ANs are silent while the UDs are transmitting/receiving each other's beacon transmissions. These types of measurements can e.g. be used for spectrum sharing in Device-to-Device (D2D) communications between UDs.

The inter-operator measurement can also be used also for the synchronization between the PLMNs. This is important especially when two PLMNs are working spectrally adjacent to each other. Higher synchronization decreases the out-of-band interference between the PLMNs. Moreover, the inter-operator measurements can be used for calibration of the antenna arrays at the ANs.

Embodiments of the present invention can be implemented in Time Division Duplex (TDD) systems as well as in Frequency Division Duplex (FDD) systems.

It may further be assumed that the sharing radio access networks have similar air interfaces, and that such radio access networks have been designed for spectrum sharing purposes.

The described invention can be utilized also between different radio access technologies if the measurement time periods are synchronized between the different radio access technologies.

Furthermore, any method according to the embodiments of the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first 100 and second 300 communication devices and control device 500 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably configured together for implementing and/or performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A second communication device for a wireless communication system, the second communication device comprising:
   a processor; and
   a transceiver configured to scan time and frequency resources of the wireless communication system during a measurement time period, wherein the measurement time period is exclusively allocated for broadcasting of beacon signals, and wherein each beacon signal is broadcasted by a first communication device in unique orthogonal time and frequency resources (OTFR) allocated for the first communication device;
   wherein the processor is configured to calculate received power or pathloss for the beacon signals;
   wherein the transceiver further is configured to forward a second signal $S_2$ to a control device of the wireless communication system, wherein the second signal $S_2$ indicates the calculated received power or calculated pathloss;
   wherein the transceiver further is configured to receive a third signal $S_3$ from the control device, the third signal $S_3$ indicating allocated time and frequency resources (TFR) for broadcasting of the beacon signals;

wherein the processor further is configured to allocate the unique OTFR for at least one beacon signal $S_b$, wherein the unique OTFR are a subset of the allocated TFR for broadcasting of the beacon signals;

wherein the transceiver further is configured to transmit a first signal $S_1$ to the first communication device, the first signal $S_1$ indicating the allocated unique OTFR.

2. The second communication device according to claim 1, wherein the allocated unique OTFR are indicated in master information blocks (MIBs), or in system information blocks (SIBs).

3. The second communication device according to claim 1, wherein the first signal $S_1$ further indicates a start point and an end point for the measurement time period.

4. The second communication device according to claim 1, wherein the second signal $S_2$ further indicates the unique OTFR for the calculated received power or calculated pathloss.

5. A control device for a wireless communication system, the control device comprising:
  a processor; and
  a transceiver configured to receive a second signal $S_2$ from a second communication device, the second signal $S_2$ indicating calculated received power or calculated pathloss at the second communication device for beacon signals broadcasted during a measurement time period, wherein the measurement time period is exclusively allocated for broadcasting of the beacon signals in the wireless communication system;
  wherein the processor is configured to estimate interference in the wireless communication system based on the calculated received power or calculated pathloss;
  wherein the processor further is configured to allocate time and frequency resources (TFR) for broadcasting of the beacon signals in the wireless communication system;
  wherein the transceiver further is configured to transmit a third signal $S_3$ to the second communication device, the third signal $S_3$ indicating the allocated TFR for broadcasting of the beacon signals.

6. The control device according to claim 5, wherein the processor further is configured to allocate time or frequency resources, based on the estimated interference, for a plurality of public land mobile networks (PLMNs) sharing time or frequency resources in the wireless communication system.

7. A wireless communication system for a plurality of co-located public land mobile networks (PLMNs), sharing time or frequency resources of the wireless communication system, the wireless communication system comprising:
  a plurality of first communication devices, including a first communication device comprising a first transceiver, wherein:
    the first transceiver is configured to broadcast at least one beacon signal $S_b$ during a measurement time period, wherein the measurement time period is exclusively allocated for broadcasting of beacon signals, and wherein the at least one beacon signal $S_b$ is broadcasted in unique orthogonal time and frequency resources (OTFR) allocated for the first communication device; and
    the first transceiver further is configured to receive a first signal $S_1$ from a second communication device, the first signal $S_1$ indicating the unique OTFR allocated for the first communication device;
  a plurality of the second communication devices, including the second communication device, the second communication device comprising a first processor and a second transceiver, wherein:
    the second transceiver is configured to scan time and frequency resources of the wireless communication system during the measurement time period, wherein the measurement time period is exclusively allocated for broadcasting of the beacon signals, and wherein each beacon signal is broadcasted by the first communication device in the unique OTFR allocated for the first communication device;
    the first processor is configured to calculate received power or pathloss for the beacon signals;
    the second transceiver further is configured to forward a second signal $S_2$ to a control device of the wireless communication system, wherein the second signal $S_2$ indicates the calculated received power or calculated pathloss;
    the second transceiver further is configured to receive a third signal $S_3$ from the control device, the third signal $S_3$ indicating allocated time and frequency resources (TFR) for broadcasting of the beacon signals;
    the first processor further is configured to allocate the unique OTFR for the at least one beacon signal $S_b$, wherein the unique OTFR are a subset of the allocated TFR for broadcasting of the beacon signals; and
    the second transceiver further is configured to transmit the first signal $S_1$ to the first communication device, the first signal $S_1$ indicating the allocated unique OTFR; and
  at least one control device, the at least one control devices including the control device, the control device comprising a second processor and a third transceiver, wherein:
    the third transceiver is configured to receive the second signal $S_2$ from the second communication device, the second signal $S_2$ indicating the calculated received power or calculated pathloss at the second communication device for the beacon signals broadcasted during the measurement time period, wherein the measurement time period is exclusively allocated for broadcasting of the beacon signals in the wireless communication system;
    the second processor is configured to estimate interference in the wireless communication system based on the calculated received power or calculated pathloss;
    the second processor further is configured to allocate the TFR for broadcasting of the beacon signals in the wireless communication system; and
    the third transceiver further is configured to transmit the third signal $S_3$ to the second communication device, the third signal $S_3$ indicating the allocated TFR for broadcasting of the beacon signals.

8. A method for a second communication device for a wireless communication system, the method comprising:
  scanning time and frequency resources of the wireless communication system during a measurement time period, wherein the measurement time period is exclusively allocated for broadcasting of beacon signals, and wherein each beacon signal is broadcasted by a first communication device in unique orthogonal time and frequency resources (OTFR) allocated for the first communication device;
  calculating received power or pathloss for the beacon signals;

forwarding a second signal $S_2$ to a control device of the wireless communication system, wherein the second signal $S_2$ indicates the calculated received power or calculated pathloss;

receiving a third signal $S_3$ from the control device, the third signal $S_3$ indicating allocated time and frequency resources (TFR) for broadcasting of the beacon signals;

allocating the unique OTFR for at least one beacon signal $S_b$, wherein the unique OTFR are a subset of the allocated TFR for the broadcasting of the beacon signals; and transmitting a first signal $S_1$ to the first communication device, the first signal $S_1$ indicating the allocated unique OTFR.

9. A method for a control device for a wireless communication system, the method comprising:

receiving a second signal from a second communication device, the second signal indicating calculated received power or calculated pathloss at the second communication device for beacon signals broadcasted during a measurement time period, wherein the measurement time period is exclusively allocated for broadcasting of the beacon signals in the wireless communication system;

estimating interference in the wireless communication system based on the calculated received power or calculated pathloss;

allocating time and frequency resources (TFR) for broadcasting of the beacon signals in the wireless communication system; and transmitting a third signal $S_3$ to the second communication device, the third signal $S_3$ indicating the allocated TFR for broadcasting of the beacon signals.

10. A non-transitory computer readable storage medium storing instructions executable by a computing system, wherein the instructions, when executed, cause the computing system to perform a method for a second communication device for a wireless communication system, the method comprising:

scanning time and frequency resources of the wireless communication system during a measurement time period, wherein the measurement time period is exclusively allocated for broadcasting of beacon signals, and wherein each beacon signal is broadcasted by a first communication device in unique orthogonal time and frequency resources (OTFR) allocated for the first communication device;

calculating received power or pathloss for the beacon signals;

forwarding a second signal $S_2$ to a control device of the wireless communication system, wherein the second signal $S_2$ indicates the calculated received power or calculated pathloss;

receiving a third signal $S_3$ from the control device, the third signal $S_3$ indicating allocated time and frequency resources (TFR) for broadcasting of the beacon signals;

allocating theunique OTFR for at least one beacon signal $S_b$, wherein the unique OTFR are a subset of the allocated TFR for broadcasting of the beacon signals; and transmitting a first signal $S_1$ to the first communication device, the first signal $S_1$ indicating the allocated unique OTFR.

11. A non-transitory computer readable storage medium storing instructions executable by a computing system, wherein the instructions, when executed cause the computing system to perform a method for a control device for a wireless communication system, the method comprising:

receiving a second signal from a second communication device, the second signal indicating calculated received power or calculated pathloss at the second communication device for beacon signals broadcasted during a measurement time period, wherein the measurement time period is exclusively allocated for broadcasting of the beacon signals in the wireless communication system;

estimating interference in the wireless communication system based on the calculated received power or calculated pathloss;

allocating time and frequency resources (TFR) for broadcasting of the beacon signals in the wireless communication system; and transmitting a third signal $S_3$ to the second communication device, the third signal $S_3$ indicating the allocated TFR for broadcasting of the beacon signals.

\* \* \* \* \*

UNITED STATES PATENT AND TRADEMARK OFFICE
CERTIFICATE OF CORRECTION

PATENT NO. : 10,530,502 B2
APPLICATION NO. : 15/684025
DATED : January 7, 2020
INVENTOR(S) : Costa et al.

Page 1 of 1

It is certified that error appears in the above-identified patent and that said Letters Patent is hereby corrected as shown below:

In the Claims

Claim 5, Column 19, Lines 37-38: "wireless communication system;" should read -- wireless communication system; and --.

Claim 7, Column 19, Line 50: "(PLMNs), sharing" should read -- (PLMNs) sharing --.

Claim 7, Column 20, Line 32: "devices" should read -- device --.

Claim 10, Column 22, Line 14: "theunique" should read -- the unique --.

Signed and Sealed this
Seventh Day of July, 2020

Andrei Iancu
*Director of the United States Patent and Trademark Office*